J. C. GOVE.
Coffee Pot.
No. 53,139.
Patented March 13, 1866.
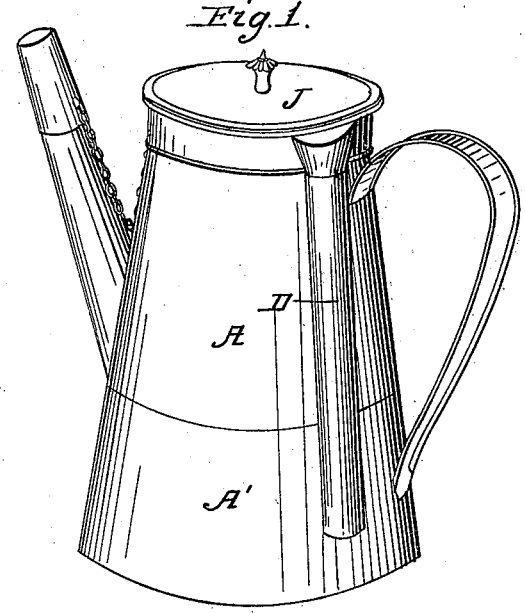
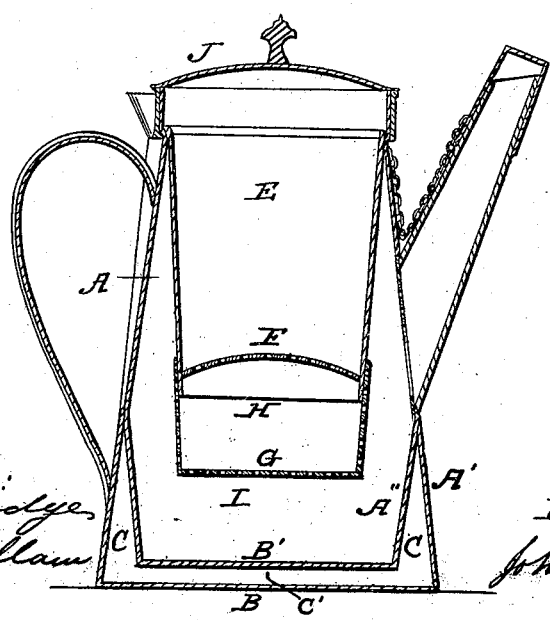

UNITED STATES PATENT OFFICE.

JOHN C. GOVE, OF CLEVELAND, OHIO.

COFFEE-POT.

Specification forming part of Letters Patent No. 53,139, dated March 13, 1866.

*To all whom it may concern:*

Be it known that I, JOHN C. GOVE, of Cleveland, in the county of Cuyahoga and State of Ohio, have invented new and useful Improvements in Coffee-Pots; and I do hereby declare that the following is a full and complete description of the construction and operation of the same, reference being had to the accompanying drawings, making part of this specification, in which—

Figure 1 is a perspective view, and Fig. 2 is a vertical section.

A A' represent the body of the coffee-pot. The lower third part has double walls A' A'' and a double bottom, B B', thus forming a water-space, C, which entirely encircles the lower third of the body and extends over the whole bottom, as shown at C' in Fig. 2.

A pipe, D, having a funnel-shaped mouth, extends down the external side of the body A A' and communicates with the water-chamber C C'.

The interior of the pot is provided with a receptacle for the ground coffee, and shown at E in Fig. 2. This receptacle rests upon the upper end of the body A and can be removed at pleasure for the purpose of charging with coffee and discharging the coffee-grounds. This receptacle has a double perforated bottom, F G. The lower one has its walls thimble-shaped, and this passes over the lower end of the part E and can be removed, when necessary, for the purpose of introducing the coffee, as above stated. The coffee is put into the space H and compressed between the perforated plates F and G. The infusion is made by pouring hot water into the vessel E, which must necessarily pass through the coffee in the chamber H into the chamber I, and it is then ready for use.

The cover J of the coffee-pot is provided with a water-joint to prevent the escape of the aroma.

By pouring water, either hot or cold, into the chamber C, through the pipe D, the lower portion of the chamber I is kept surrounded with water, so that the vessel can be set upon a hot stove or even upon live coals without danger of burning the infusion.

What I claim as my improvement, and desire to secure by Letters Patent, is—

The arrangement of a coffee-pot having a water-joint cover, J, an exterior water-chamber, C, and tube D, and the interior coffee-chamber, I, and receptacle E, the several parts being constructed and combined substantially as and for the purposes set forth.

JOHN C. GOVE.

Witnesses:
W. H. BURRIDGE,
A. W. McCLELLAND.